United States Patent [19]
Schwarz

[11] Patent Number: 6,021,422
[45] Date of Patent: Feb. 1, 2000

[54] PARTITIONING OF BINARY QUAD WORD FORMAT MULTIPLY INSTRUCTION ON S/390 PROCESSOR

[75] Inventor: Eric Mark Schwarz, Gardiner, N.Y.

[73] Assignee: International Business Machines Corporation, Armonk, N.Y.

[21] Appl. No.: 09/033,626

[22] Filed: Mar. 5, 1998

[51] Int. Cl.[7] ................................ G06F 7/44; G06F 7/38
[52] U.S. Cl. .......................................... 708/503; 708/510
[58] Field of Search ..................................... 708/503, 510

[56] References Cited

U.S. PATENT DOCUMENTS

| | | | |
|---|---|---|---|
| 4,594,679 | 6/1986 | George et al. | 708/503 |
| 5,687,106 | 11/1997 | Schwarz et al. | |
| 5,740,093 | 4/1998 | Sharangpani | 708/510 |
| 5,909,385 | 6/1999 | Nishiyama et al. | 708/503 |

OTHER PUBLICATIONS

"CMOS Floating–Point Unit For The S/390 Parallel Enterprise Server G4" by Schwarz et al., IBM Journal of Research and Development, vol. 41, No. 4/5, Jul./Sep. 1997, pp. 475–488.

"Hardware Implementation of Sine/Cosine Polynomial Approximation" by Desrosiers et al., IBM TDB, vol. 37, No. 11, Nov. 1994, pp. 609–613.

*Primary Examiner*—Tan V. Mai
*Attorney, Agent, or Firm*—Lynn L. Augspurger

[57] ABSTRACT

There is a unique partitioning problem in determining how to execute the floating point multiply instruction defined by IEEE 754 standard for the quad word format on a S/390 processor. Several manufacturers including IBM and HP define the binary quad word format to have a 113 bit significand. IBM S/390 hexadecimal long floating point format has a 56 bit significand and most S/390 floating point units only contain a long format multiplier. Quad word format multiplication must be executed as a series of several long precision multiplications and extended precision or long precision additions. The S/390 hexadecimal quad word format is easier to implement than binary format since it has a 112 bit significand and can easily be partitioned into two 56 bit parts. But a 113 bit significand would just exceed two partitions and require a third. For extended precision multiplies each partition is multiplied by each other, so if there are two partitions only four multiplies are required but for three partitions this increases to nine multiplies. Methods for partitioning are disclosed here.

12 Claims, 4 Drawing Sheets

PARTITIONING OF BINARY QUAD WORD FORMAT MULTIPLY INSTRUCTION ON S/390 PROCESSOR

CROSS REFERENCE TO RELATED APPLICATION

The present application related to the following patent application filed by the inventor concurrently herewith.

Floating point binary quad word format multiply instruction Unit filed Mar. 4, 1998, and accorded U.S. Ser. No. 09/034,718.

This application and the present application are owned by one and the same assignee, International Business Machines Corporation of Armonk, N.Y.

FIELD OF THE INVENTION

This invention is related to computers and computer systems and the floating point unit thereof and in particular to the execution of the floating point operation of multiply according to the binary quad word format.

BACKGROUND OF THE INVENTION

The "IEEE Standard for Binary Floating-Point Arithmetic" (IEEE 754 Standard) defines a format called double extended which specifies a representation with a one bit sign, 15 or more bits of exponent, and 64 or more bits of significand. There has been discussions among the standards committee of adopting a quad word format which is more restrictive but is a subset of the double extended format. Several manufacturers including Hewlett-Packard's PA-RISC 1.1 Architecture and IBM S/390 have adopted a specific quad word format which contains one bit of sign information, 15 bits of exponent, and 113 bits of significand where the most significant bit is implied. This format requires 128 bits or one quad word to represent an operand.

Most floating point units are not optimized for the quad word format and instead are optimized for the frequently used double word format. The quad word format operands must be partitioned into the hardware implemented format and then multiple smaller operations are performed to accomplish the overall quad word format operation. One floating operation which is typically supported in this fashion is the multiplication operation for quad word format.

Note that the definition of quad word format that is referred to by Hewlett-Packard's PA-RISC 1.1 Architecture is called binary extended format by the S/390 Architecture, but they are identical except for the representation of signaling NaN and quiet NaN which is not important for this discussion. S/390 Architecture also supports a unique hexadecimal based format which has a short (word), long (double word), and extended (quad word) formats. In typical S/390 floating point units hexadecimal double word precision is optimized in hardware, which is similar to other manufacturers optimizing for IEEE 754 standard double word format since both formats require 64 bits to represent. Hexadecimal double format contains one bit of sign information, seven bits of exponent, and a 56 bit significand. S/390 floating point unit dataflows are typically optimized for 56 bit operands. The multiplier, if used for other purposes such as for division operations, may have some additional guard bits. In a performance optimized multiplier implementation one of the operands, the multiplier, is not extended by any guard bits since one additional bit has a dramatic effect on the overall delay of the counter tree. But, the other operand, the multiplicand, has a less substantial effect on the delay of the counter tree and can easily be extended by one or two hex digits. Typical S/390 multipliers have a multiplier which is 56 bits and a multiplicand which is 60 or 64 bits (see for instance "CMOS floating-point unit for the S/390 Parallel Enterprise Server G4," E. M. Schwarz, L. Sigal, T. J. McPherson, IBM Journal of Research and Development, Vol. 41, No. 4/5, July/September 1997, pp.475–488.)

The method of optimizing the binary extended format (quad word format) to a S/390 floating point unit for a system where the 56 bit significand dataflow is slightly less than half the 113 bit significand of the binary extended format has not been found since the adoption of the IEEE standard over a decade ago. In particular, the present invention is concerned with implementing the multiplication operation for binary quad word format on a typical S/390 multiplier.

SUMMARY OF THE INVENTION

Our invention provides a process for performing the binary quad word format multiplication operation on a hardware multiplier which supports 56 and 60 bit operands and a hexadecimal based exponent. This type of hardware multiplier is commonly available on S/390 floating point units. The process provides minimal hardware operations to perform the overall quad word format multiplication and still retains intermediate results in a hexadecimal based format which is an advantage for a hexadecimal based design.

The invention involves a unique partitioning of the 113 bit significand to only require four multiplies and also handle some additional complications of executing binary operands on a hexadecimal dataflow. The multiplier operand's significand is partitioned into three groups of one, 56, and 56 bits each and the multiplicand operand's significand is partitioned into two groups of 56 and 60 bits.

S/390 floating point architecture defines a hexadecimal based format which is described by the following: $X=(-1)^{**}S^*0.F^*16^{}(Xh-64)$ where X is the value of an operand, S is the one bit sign, F is the significand, and Xh is the characteristic which reduced by a bias of 64 forms the exponent. The binary extended format has a format as described by the following: $X=(-1)^{}S^*1.F^*2^{}(Xb-16383)$ where Xb represents the binary characteristic. U.S. Pat. No. 5,687,106 [Schwarz et al] teaches a method for supporting both a hexadecimal floating point format and a binary floating point format using an internal floating point dataflow with hexadecimal floating point format. The internal dataflow suggested has a 14 bit exponent and a bias of 8192 which can be represented by $X=(-1)^{}S^*0.F^*16^{}(Xi-8192)$ where Xi represents the internal characteristic. To transform a binary exponent into a hex format is equivalent to shifting the characteristic right two bits and applying a bias adjustment. The least significant two bits of binary exponent which are shifted out represent the values $2^{}0$, $2^{}1$, $2^{}2$, or $2^{**}3$. This exponent value in the binary architected format is transformed into a shift of the significand of up to 3 bits in going into the internal hexadecimal based format. In order to represent a 53 bit long binary significand in this hex format, 3 additional bits are necessary for this shifting which gives a total of 56 bits. For extended format, this would require a 116 bit significand.

The partitioning solution involves only applying the 3 bit binary shift to only one operand, the multiplicand. And the 3 bit shift used is the combination of binary shifts for both input operands. The multiplier significand is separated into 3 parts which consist of an explicit 1, 56 bit high part, and a 56 bit low part for a total of 113 bits. And the multiplicand significand is expanded into a 116 bit significand with the combination of binary shifts for both input operands and partitioned into a 56 bit part and a 60 bit part. So the multiplier has 3 parts denoted: 1, YH (56 bits), YL (56 bits) and the multiplicand has 2 parts denoted: XH (56 bits) and XL (60 bits).

Only four multiplications are necessary to compute binary multiply extended with this partitioning: YL*XL, YL*XH, YH*XL, and YH*XH, and the multiplier size is only 56 by 60 bits. The multiplication by 1 does not need any calculation. Another advantage of this algorithm is that the least significant two bits of the binary exponent are maintained in the dataflow by the significand's binary normalization within the hex format which is also how they are maintained for other binary floating point operations.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1:
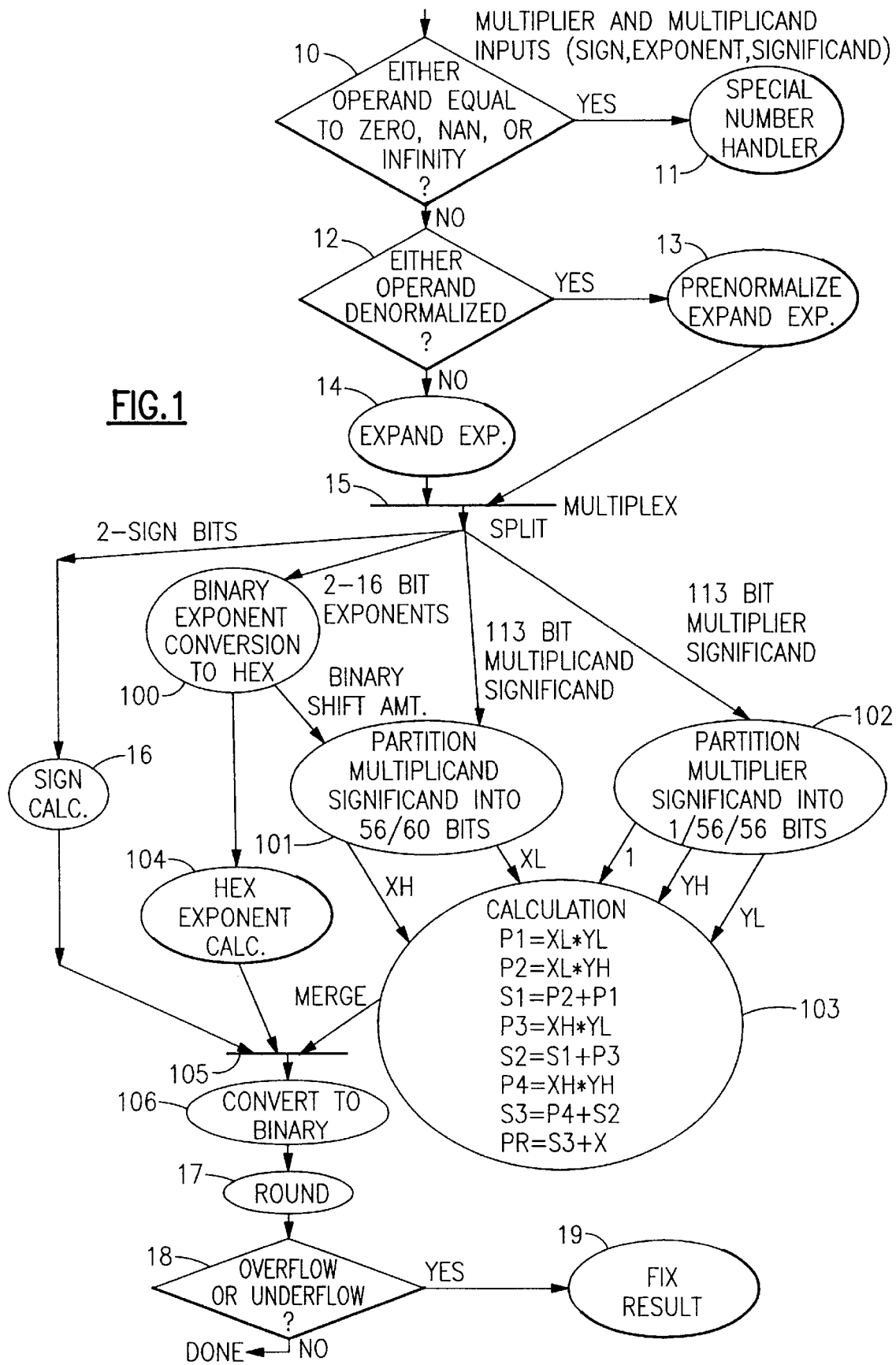
FIG. 1 shows schematically an overview of the preferred embodiment and particularly shows a process flow of the multiplication operation for binary extended format which partitions the multiplicand into 56 and 60 bit parts, and the multiplier into 1, 56, and 56 bit parts.

Turning now to our invention in greater detail, it will be seen from FIG. 1 which illustrates our preferred embodiment in which the process flow of executing a floating point multiplication operation for binary extended precision format is shown for floating point hardware which is optimized for hexadecimal based double word format. The process flow includes subprocesses for detecting if there is a special case operand, if the operands are denormalized, and a sign computation step, an exponent calculation step, partitioning steps for the multiplier and multiplicand significands, and rounding and overflow detecting steps.

The multiplier and multiplicand input operands contain a sign, exponent, and significand portions which are input to the decision block stage 10 which determines if either of the input operands is equal to IEEE 754 special numbers zero, Not-a-Number (NaN), or infinity. If either operand is one of these special numbers the calculation proceeds to the special number handler 11 and no arithmetic calculation is necessary. If neither is one of the three special numbers then the process continues to the decision block stage 12 which determines if either operand is a denormalized number. If either operand is denormalized as defined by the IEEE 754 standard, the process is directed to a prenormalization block stage which normalizes the operands and creates an expanded exponent range of one more bit, and the process continues to multiplexor 15. If neither operand is denormalized as determined by the decision block stage 12 then the exponent expanded in process block stage 14 and the process converges with the prenormalization path in multiplexor 15.

The process is then split into four parallel paths. The two operand's sign bits are processed in the sign calculation block stage 16 which is simply an exclusive-OR of the signs. The two 16 bit binary exponents are processed by a binary exponent conversion to hex block stage 100. The hex exponents of the two operands are output to a hex exponent calculation block stage 104 which adds the exponents and subtracts the bias. The 113 bit multiplicand significand is processed by block stage 101 using the binary shift amount information from the binary exponent conversion block stage 100. The partitioning of the multiplicand is into two parts of 56 bit high part designated XH and a 60 bit low part designated XL. 116 bits are used in the significand to represent the 113 bit multiplicand and the binary shift amount which could be $2^{}0$, $2^{}-1$, $2^{}-2$, or $2^{}-3$. The multiplier operand 113 bit significand is input to a partitioning block stage 102 which separates the operand into an explicit value of 1, a 56 bit high part designated YH, and a 56 bit low part designated YL.

In U.S. Pat. No. 5,687,106 [Schwarz et al] the binary exponent conversion block stage consisted of taking one binary exponent and converting it to a hex exponent and an appropriate shift amount by the following formulas:

| 1.xxx * $2^{**}$(Xb − 16383) => 0.f * $16^{**}$(Xi − 8192) | | |
|---|---|---|
| Xb least significant two bits | Xi | Hex internal Significand |
| 11 | SIGNEXT(Xb>>2) + 2 | 0.000 ‖ 113 bit significand |
| 00 | SIGNEXT(Xb>>2) + 1 | 0.00 ‖ 113 bit significand |
| 01 | SIGNEXT(Xb>>2) + 1 | 0.0 ‖ 113 bit significand |
| 10 | SIGNEXT(Xb>>2) + 1 | 0. ‖ 113 bit significand | where Xb represents the binary characteristic and Xi the transformed hex internal characteristic, and Xb>>2 is Xb shifted with truncation two bits to the right,‖ represents concatenation, and SIGNEXT involves setting the most significant bit of Xi with the most significant bit of Xb and filling in any lesser significant bits with this bit complemented.

For extended format, Xb is 15 bits and the shifting truncates the least significant two bits which leaves 13 bits. Xi is 14 bits and the SIGNEXT of the 13 bit intermediate result can be expressed by the following equation:

SIGNEXT(Xb(0:14)>>2)=Xb(0)‖Xb(0)'‖Xb(1:12)

where ' represents one's complementation.

The binary exponent conversion to hex block stage 100 performs the combination of both binary exponent conversions but with a fixed multiplier significand of the form 1., YH,YL and a multiplicand which takes on both binary shift amounts in its significand representation. The following formulas show that the multiplier has a fixed format significand that requires a correction term which is then applied in the conversion of the multiplicand, Y.

1.xxx * 2**(Xb – 16383) => 1.f * 16**(Xi – 8192) * Correction
1.xxx * 2**(Yb – 16383) * Correction => 0.f * 16**(Yi – 8192)

Multiplier Conversion:

| Xb least significant two bits | Xi | Correction Term |
|---|---|---|
| 00 | SIGNEXT(Xb>>2) | 2**1 |
| 01 | SIGNEXT(Xb>>2) | 2**2 |
| 10 | SIGNEXT(Xb>>2) | 2**3 |
| 11 | SIGNEXT(Xb>>2) + 1 | 2**0 |

Multiplicand Conversion without Correction:

| Yb least significant two bits | Yi | Hex internal Significand |
|---|---|---|
| 00 | SIGNEXT(Yb>>2) + 1 | 0.00 ∥ 113 bit significand |
| 01 | SIGNEXT(Yb>>2) + 1 | 0.0 ∥ 113 bit significand |
| 10 | SIGNEXT(Yb>>2) + 1 | 0. ∥ 113 bit significand |
| 11 | SIGNEXT(Yb>>2) + 2 | 0.000 ∥ 113 bit significand |

Multiplicand Conversion with Correction:

| Yb least significant two bits + correction | Yi | Hex internal Significand |
|---|---|---|
| 000 | SIGNEXT(Yb>>2) + 1 | 0.00 ∥ 113 bit significand |
| 001 | SIGNEXT(Yb>>2) + 1 | 0.0 ∥ 113 bit significand |
| 010 | SIGNEXT(Yb>>2) + 1 | 0. ∥ 113 bit significand |
| 011 | SIGNEXT(Yb>>2) + 2 | 0.000 ∥ 113 bit significand |
| 100 | SIGNEXT(Yb>>2) + 2 | 0.00 ∥ 113 bit significand |
| 101 | SIGNEXT(Yb>>2) + 2 | 0.0 ∥ 113 bit significand |
| 110 | SIGNEXT(Yb>>2) + 2 | 0. ∥ 113 bit significand |

The binary exponent conversion to hex block stage 100 performs the fixed multiplier exponent conversion and passes the correction term to the multiplicand exponent conversion which also produces a binary shift amount signal which is transmitted to the multiplicand significand partitioning block stage 101.

The outputs XH and XL of partitioning block stage 101 and the outputs 1, YH, and YL of partitioning block stage 102 are input to a calculation block stage 103. The calculation process involves performing 4 multiplications and 4 additions. These calculations can be expressed by the following equations which produce partial products P1, P2, P3, and P4, intermediate sums S1, S2, and S3, and the final product denoted by PR.

1) P1=XL*YL
2) P2=XL*YH
3) S1=P2+P1
4) P3=XH*YL
5) S2=S1+P3
6) P4=XH*YH
7) S3=P4+S2
8) PR=S3+X

The product is output from calculation block stage 103 and merged with the hex exponent from the calculation block stage 104 and the sign bit from the calculation block stage 16, in the merge block stage 105. The product which is represented in hexadecimal internal format is converted back to binary format in calculation block stage 106 and rounded in calculation block stage 17. The result is then checked in decision block stage 18 for an overflow or underflow condition which if true is sent to fix-up block stage 19 and if false is determined to be the reported result and the process is completed.

The block stages numbered 10 through 19 are not unique to the preferred embodiment and only block stages 100 to 106 are unique. The proposed process provides a unique partitioning of the significand which reduces the calculation time to the latency of 4 multiplications and 4 additions. The intermediate results are kept in a hexadecimal format which is a benefit to a hexadecimal based floating point unit for ease of debugging hardware problems. Also, there is the benefit that a hexadecimal internal format can be transmitted earlier to the top of the pipeline to resolve a data dependency with the next sequential instruction.

Figure 2:
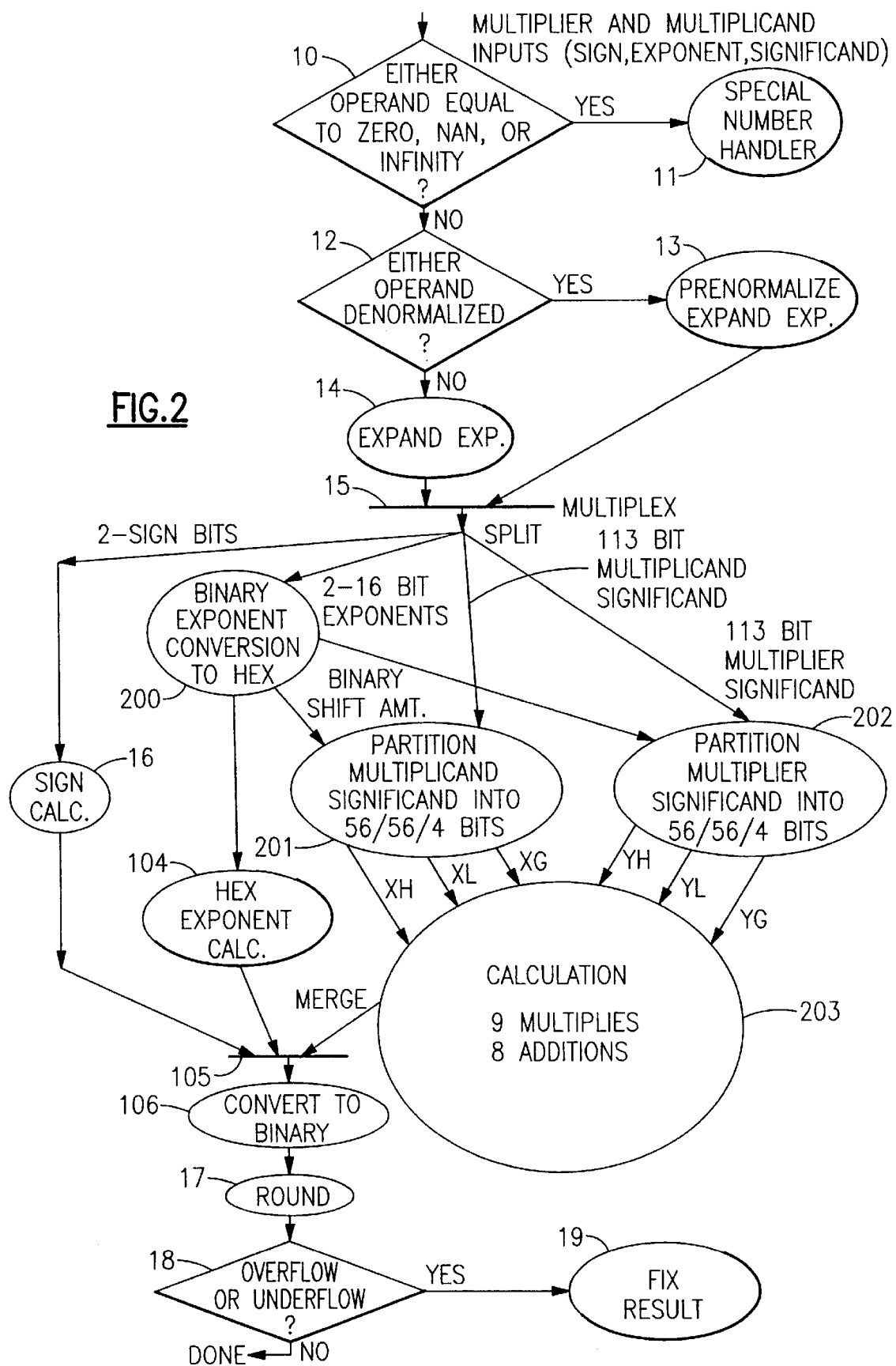
FIG. 2 shows schematically an overview of a first alternative and particularly shows a process flow of the multiplication operation for binary extended format which partitions the multiplicand into 56, 56, and 4 bit parts, and the multiplier into 56, 56, and 4 bit parts.
Figure 3:
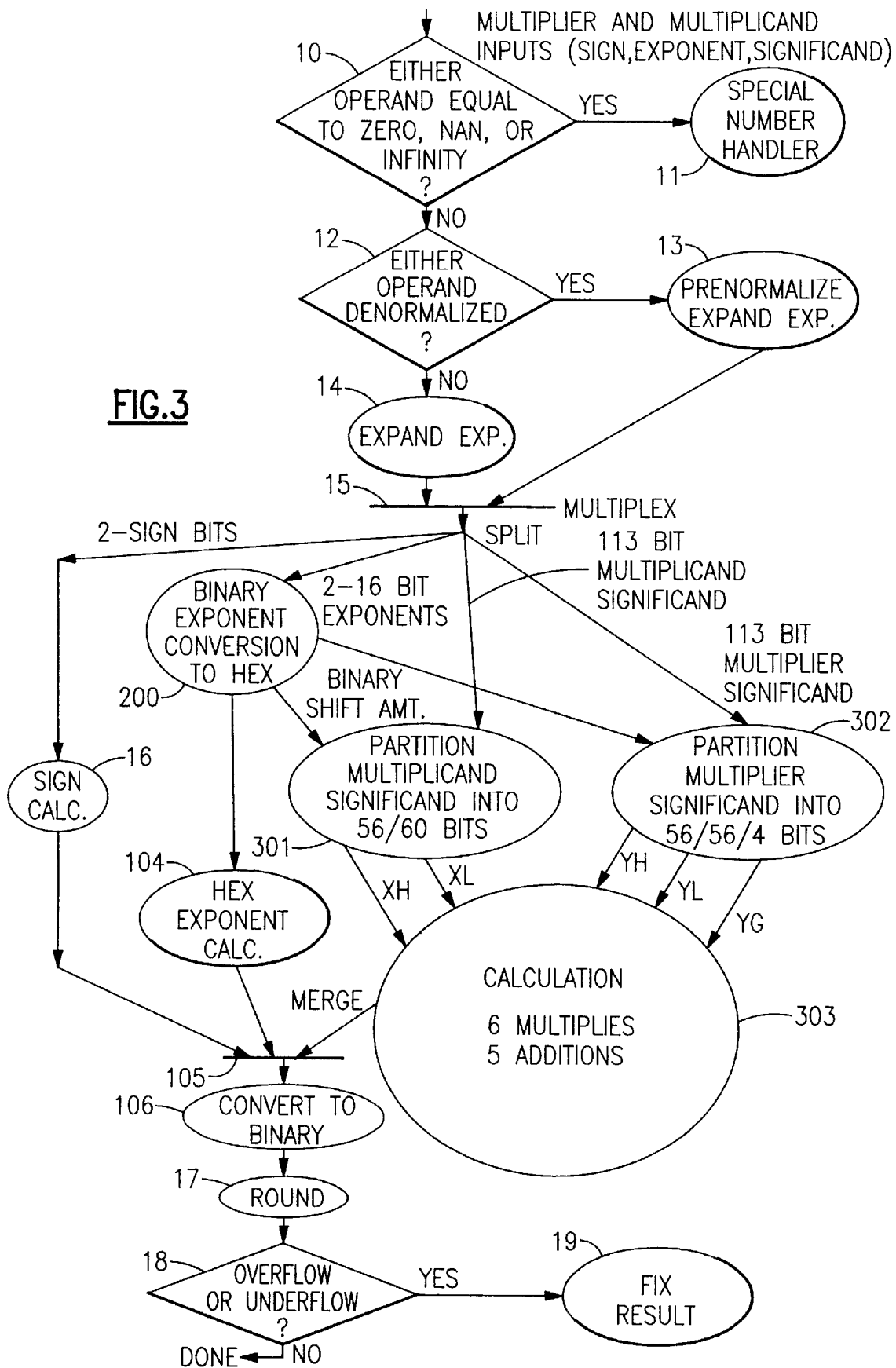
FIG. 3 shows schematically an overview of a second alternative and particularly shows a process flow of the multiplication operation for binary extended format which partitions the multiplicand into 56 and 60 bit parts, and the multiplier into 56, 56, and 4 bit parts.
Figure 4:
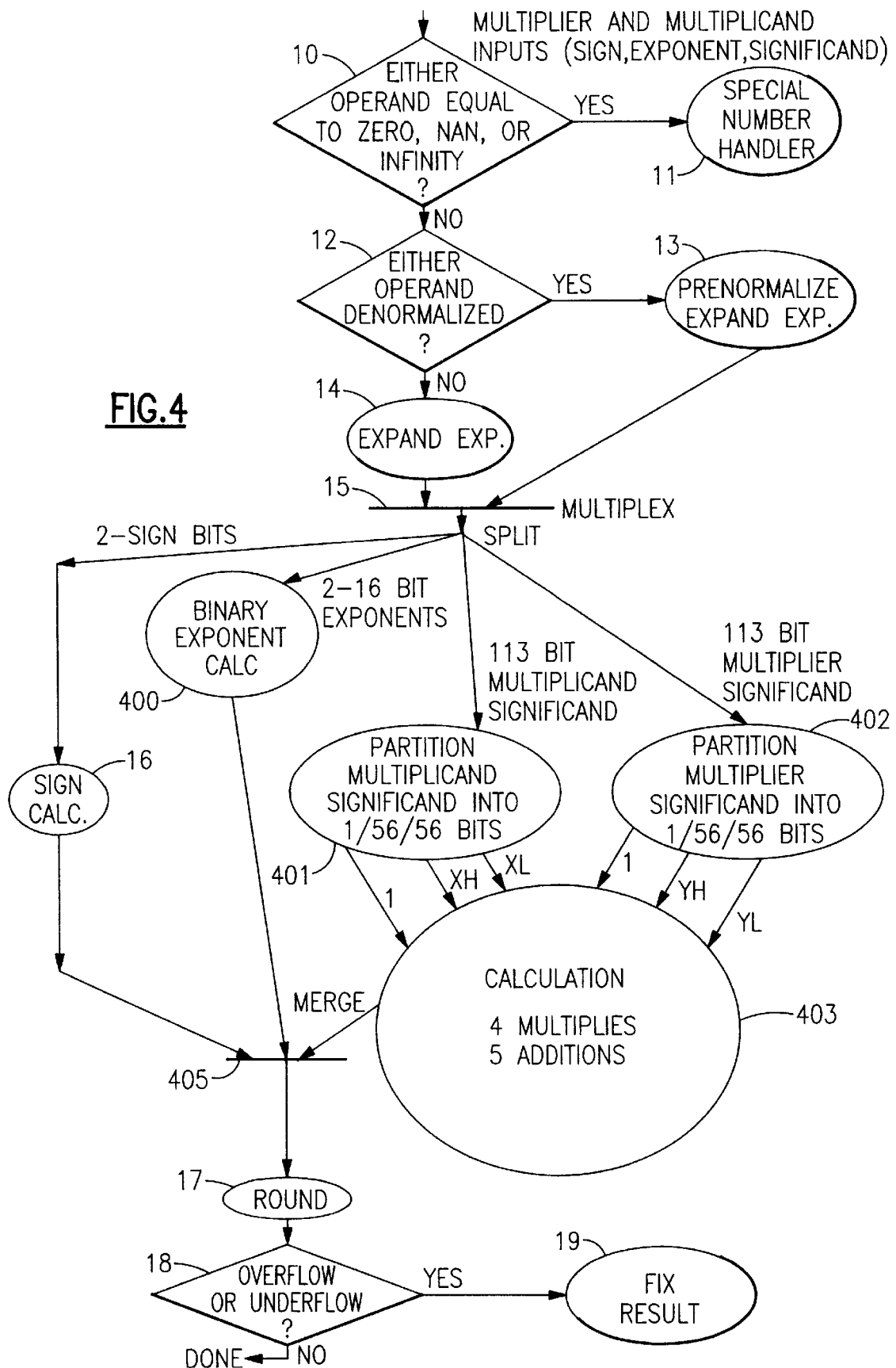
FIG. 4 shows schematically an overview of a third alternative and particularly shows a process flow of the multiplication operation for binary extended format which partitions the multiplicand into 1, 56, and 56 bit parts, and the multiplier into 1, 56, and 56 bit parts.

Three alternatives to the preferred embodiment are described in FIGS. 2, 3, and 4. In FIG. 2 a first alternative is shown where block stages 10–19 are the same as in FIG. 1 as well as block stages 104 and 105. The process block stages for the exponent and significands differ. In FIG. 2 the first alternative method receives the two 16 bit exponents in the binary exponent conversion to hex block stage 200. This conversion block stage 200 computes binary shift amounts for the multiplicand and multiplier independently according to the implementation in U.S. Pat. No. 5,687,106 [Schwarz et al], and passes these shift amounts to partitioning block stages 201 and 202. Given that the binary shift amounts are to be represented in both the multiplier and multiplicand both require 116 bits to represent and a partitioning of 56, 56, and 4 bit parts is chosen for both and performed by block stage 201 and 202 respectively. The 3 parts of the multiplicand are designated XH, XL, and XG, and the multiplier parts are designated YH, YL, and YG. This results in the significand calculation block stage requiring 9 multiplications of 3 parts of X by 3 parts of Y, and 8 additions to sum the 9 partial products. This will be much lower performance than the preferred embodiment but this scheme is a straightforward method of partitioning the multiplier and multiplicand given that they are to be represented internal to the pipeline in a hexadecimal format which requires 116 bits per operand.

In FIG. 3 a second alternative is shown where block stages 10–19 are the same as in FIG. 1 as well as block stages 104 and 105. And the binary exponent conversion to hex block stage 200 of FIG. 3 is the same as in FIG. 2 for the first alternative method. The process block stages for the significands differ and second alternative method is an optimization of the first alternative method given that the multiplier hardware supports one significand of 60 bits. In FIG. 3, the multiplicand is partitioned into 56 and 60 bits which are designated by XH and XL by partitioning block stage 301. The multiplier is partitioned into 3 parts of 56, 56, and 4 bits designated YH, YL, and YG respectively by partitioning block stage 302. The significand calculation block stage 303 of this second alternative method requires 6 multiplications since there are 2 multiplicand parts and 3 multiplier parts, and requires 5 additions to sum the partial products. This an improvement over the first alternative but still is much slower than the preferred embodiment described in FIG. 1.

In FIG. 4 a third alternative is shown where block stages 10–19 are the same as in FIG. 1. This third alternative assumes the exponent calculations are directly executed on the binary exponents and the significands are treated as 113 bit quantities without a corresponding hexadecimal exponent. The binary exponent calculation block stage 400 sums the binary exponents together. The 113 bit multiplicand significand is partitioned into 1, 56, and 56 parts by partitioning block stage 401 and are referred to as 1, XH, and XL respectively. The 113 bit multiplier significand also is partitioned into 1, 56, and 56 parts by partitioning block stage 402 and are referred to as 1, YH, and YL respectively. The significand calculation block stage is able to perform the product calculation by only 4 multiplications which is equivalent to the preferred embodiment in FIG. 1, but there are more additions required due to the extra implied 1. Also, this third alternative does not have the advantage of resolving data dependencies early and contains intermediate results in non-native format where the native floating point unit format is hexadecimal.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method of using a floating point unit (FPU) for executing the floating point multiply instruction defined by the IEEE 754 standard for binary extended precision format for the quad word format on a computer processor having floating point hardware which is optimized for hexadecimal based double word format and defining the binary quad word format to have a 113 bit significand and wherein quad word format multiplication must be executed as a series of several long precision multiplications and extended precision or long precision additions by the computer processor with a multiplier and multiplicand input, comprising the steps of: receiving in a FPU dataflow pipeline for performing the multiplications by said central processor having a floating point multiplier in the pipeline multiplier and multiplicand input operands contain a sign, exponent, and significand portions which are input to a decision block stage which determines if either of the input operands is equal to IEEE 754 special numbers of zero, Not-a-Number (NaN), or infinity, and if either operand is one of said special numbers passing said dataflow to be handled by a special number handler without an arithmetic calculation as no arithmetic calculation is necessary, but if neither operand is is one of the three special numbers then continuing movement of the operands in the data flow to a decision block stage which determines whether either operand is a denormalized number, and if either operand is denormalized as defined by the IEEE 754 standard, directing the dataflow processing to a prenormalization block stage which normalizes the operands and creates an expanded exponent range of one more bit, and passing the dataflow for processing to a parallel path multiplexor stage, but if neither operand is denormalized as determined by said decision block stage then expanding the exponent of the number in an expansion process block stage and then passing the dataflow to said parallel path multiplexor which receives the dataflow convergence from said prenormalization path as well as from said expansion process block stage then splitting said dataflow for processing into four parallel paths, one of said parallel paths having a sign calculation block stage, a second of said parallel paths having an exponent conversion to block stage, a third of said parallel paths having a partition multiplicand significand block stage, and a fourth of said parallel paths having a partition multiplier significand block stage, whereupon said two operand's sign bits are processed in said sign calculation block stage, the operands' two 16 bit binary exponents are processed by said exponent conversion block stage, and said multiplicand is partitioned in a partition multiplicand significand block stage which receives a 113 bit multiplicand significand input from said multiplexor, and partitioning said multiplier in said fourth path having a 113 bit multiplier input in a partition multiplier significand block stage, and thereafter converging the dataflow from said third and fourth paths in a calculation block stage which performs multiplications and additions which provide partial products and intermediate sums and finally a final product to provide a calculation block stage output, said calculation block stage output and said exponent from said second path and the sign bit from said first path merging in a merge block stage to provide a product which is represented in hexadecimal internal format and is converted back to binary format in calculation block stage and rounded.

2. A method according to claim 1 wherein said second of said parallel paths having an exponent conversion stage is a binary exponent to hex block stage, said third of said parallel paths having a partition multiplicand significand partitions into a 56/60 bit block stage, and said fourth of said parallel paths having a partition multiplier significand partitions into 1/56/56 bits block stage, wherein said two operand's sign bits are processed in said sign calculation block stage, the operands' two 16 bit binary exponents are processed by a binary exponent conversion to a hex block stage from which hex exponents of the two operands are output to a hex exponent calculation block stage of said second parallel path which adds the exponents and subtracts any bias, and from which binary exponent conversion to a hex block stage any shift is passed to said third of said parallel paths having a partition multiplicand significand partitioned into bits block stage which also receives a 113 bit multiplicand significand input from said multiplexor, and in which fourth path a 113 bit multiplier input is provided to said fourth of said parallel paths having a partition multiplier significand partitioned into bits block stage, and wherein said third and fourth paths converge in a calculation block stage which performs multiplications and additions which provide partial products and intermediate sums and finally a final product which is the calculation block stage output, said calculation block stage output and said hex exponent from said second path and the sign bit from said first path merging in a merge block stage to provide a product which is represented in hexadecimal internal format and is converted converted back to binary format in calculation block stage and rounded.

3. A method according to claim 2 wherein third of said parallel paths having a partition multiplicand significand partitions into 56/60 bits, and said fourth of said parallel paths having a partition multiplier significand partitions into 1/56/56 bits.

4. A method according to claim 3 wherein said calculation block stage performs 4 multiplications and 4 additions which provide partial products and intermediate sums and a final product.

5. A method according to claim 2 wherein third of said parallel paths having a partition multiplicand significand partitions into 56/56/4 bits, and said fourth of said parallel paths having a partition multiplier significand partitions into 56/56/4 bits.

6. A method according to claim 5 wherein said calculation block stage performs 9 multiplications and 8 additions which provide partial products and intermediate sums and a final product.

7. A method according to claim 2 wherein third of said parallel paths having a partition multiplicand significand partitions into 56/60 bits, and said fourth of said parallel paths having a partition multiplier significand partitions into 56/56/4 bits.

8. A method according to claim 7 wherein said calculation block stage performs 6 multiplications and 5 additions which provide partial products and intermediate sums and a final product.

9. A method according to claim 1 wherein partitioning of the multiplicand is into two parts of 56 bit high part and a 60 bit low part.

10. A method according to claim 9 wherein the multiplier operand 113 bit significand in said fourth multiplier partitioning block stage which separates the operand into an explicit value of 1, a 56 bit high part and a 56 bit low part.

11. A method according to claim 1 wherein third of said parallel paths having a partition multiplicand significand partitions into 1/56/56 bits, and said fourth of said parallel paths having a partition multiplier significand partitions into 1/56/56 bits.

12. A method according to claim 11 wherein said calculation block stage performs 4 multiplications and 5 additions which provide partial products and intermediate sums and a final product.

* * * * *

UNITED STATES PATENT AND TRADEMARK OFFICE
CERTIFICATE OF CORRECTION

PATENT NO. : 6,021,422
DATED : February 1, 2000
INVENTOR(S) : Schwarz

It is certified that error appears in the above-identified patent and that said Letters Patent is hereby corrected as shown below:

Title page,
Item [22], Filed "Mar. 5, 1998" should be -- Mar. 4, 1998 --.

Signed and Sealed this

Twentieth Day of November, 2001

Attest:

*Attesting Officer*

NICHOLAS P. GODICI
*Acting Director of the United States Patent and Trademark Office*